(12) United States Patent
O'Conaire et al.

(10) Patent No.: US 10,496,188 B2
(45) Date of Patent: Dec. 3, 2019

(54) ZONAL INPUT DEVICE

(71) Applicant: Logitech Europe S.A., Lausanne (CH)

(72) Inventors: Cormac O'Conaire, Dublin (IE);
Andreas Connellan, Dublin (IE);
Christopher Pate, San Lorenzo, CA (US)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 14/469,521

(22) Filed: Aug. 26, 2014

(65) Prior Publication Data
US 2015/0054746 A1 Feb. 26, 2015

Related U.S. Application Data

(60) Provisional application No. 61/870,148, filed on Aug. 26, 2013.

(51) Int. Cl.
*G06F 3/0354* (2013.01)
(52) U.S. Cl.
CPC .. *G06F 3/03543* (2013.01); *G06F 2203/0333* (2013.01)
(58) Field of Classification Search
CPC .............. G06F 3/03543; G06F 2203/0333
See application file for complete search history.

(56) References Cited

U.S. PATENT DOCUMENTS

| | | | | |
|---|---|---|---|---|
| 5,340,067 A * | 8/1994 | Martin | .................... | G06F 3/039 248/118.5 |
| 5,527,100 A * | 6/1996 | O'Donnell | ............. | A63C 17/22 301/5.302 |
| 5,788,195 A * | 8/1998 | Rice | ........................ | G06F 3/039 248/118.5 |
| 6,005,553 A * | 12/1999 | Goldstein | ........... | G06F 3/03543 345/163 |
| 6,431,504 B1 * | 8/2002 | Ignagni | ............... | G06F 3/03543 248/118 |
| 6,456,275 B1 * | 9/2002 | Hinckley et al. | ............. | 345/156 |
| 6,664,947 B1 * | 12/2003 | Vinogradov | ........ | G06F 3/03543 345/157 |
| 7,006,075 B1 * | 2/2006 | Olson | ................. | G06F 3/03543 345/156 |
| 7,212,191 B2 * | 5/2007 | Snijders | .............. | G06F 3/03543 345/156 |
| 7,705,827 B1 * | 4/2010 | Robinson | ............ | G06F 3/03543 345/163 |

(Continued)

*Primary Examiner* — Sejoon Ahn
(74) *Attorney, Agent, or Firm* — Kilpatrick Townsend & Stockton LLP

(57) ABSTRACT

In certain embodiments, a computer mouse includes a chassis to provide support for a user's hand, where the chassis includes a knuckle support region, a palm support region, a first side region having a first ledge to support a thumb, a second side region having a second ledge to support one or more of a pinky or ring finger, and a button region having one or more buttons to support one or more of a tip of an index finger or middle finger. Each region can be physically separated from one another on the surface of the chassis by a gap. The knuckle support region can include a coating or covering on a surface of the knuckle support region to provide a directionally dependent friction. The friction on the surface of the knuckle support region is higher for side-to-side movements than for front-to-back movements.

12 Claims, 13 Drawing Sheets

(56) References Cited

U.S. PATENT DOCUMENTS

| | | | | |
|---|---|---|---|---|
| 2002/0024502 A1* | 2/2002 | Iwasaki | ............... | G06F 3/03543 345/163 |
| 2002/0057258 A1* | 5/2002 | Reid | ................... | G06F 3/03543 345/163 |
| 2002/0084985 A1* | 7/2002 | Hesley | .................... | G06F 3/039 345/163 |
| 2005/0275621 A1* | 12/2005 | Saez | ................... | G06F 3/03543 345/156 |
| 2006/0007152 A1* | 1/2006 | Wang | ................. | G06F 3/03543 345/163 |
| 2006/0274044 A1* | 12/2006 | Gikandi | .............. | G06F 3/03543 345/163 |
| 2008/0007525 A1* | 1/2008 | Sim | ..................... | G06F 3/03543 345/163 |
| 2010/0285275 A1* | 11/2010 | Baca | ....................... | C03C 3/083 428/141 |
| 2012/0105330 A1* | 5/2012 | Ma | ...................... | G06F 3/03543 345/163 |
| 2012/0295709 A1* | 11/2012 | Adhikari | ................ | A63F 13/24 463/37 |
| 2013/0088556 A1* | 4/2013 | Hagspiel | ................ | B44C 5/043 347/110 |

* cited by examiner

Thumb surface morphs between convex and concave forms to accommodate variation in grip styles and use cases The rear panel can articulate into the most comfortable position for ideal palm support for extended comfort

REAR VIEW

ADJUSTED FORM

ORIGINAL FORM

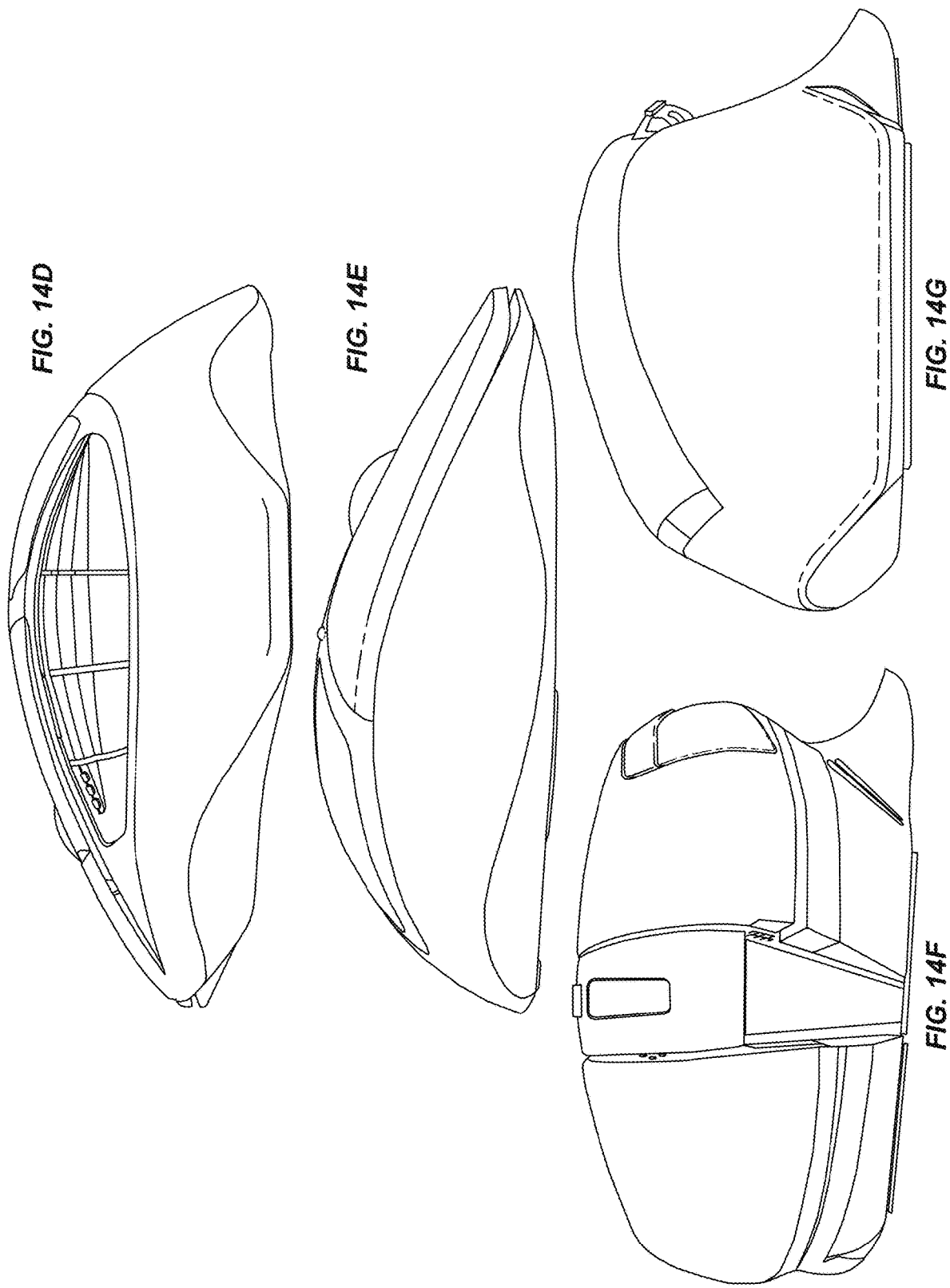

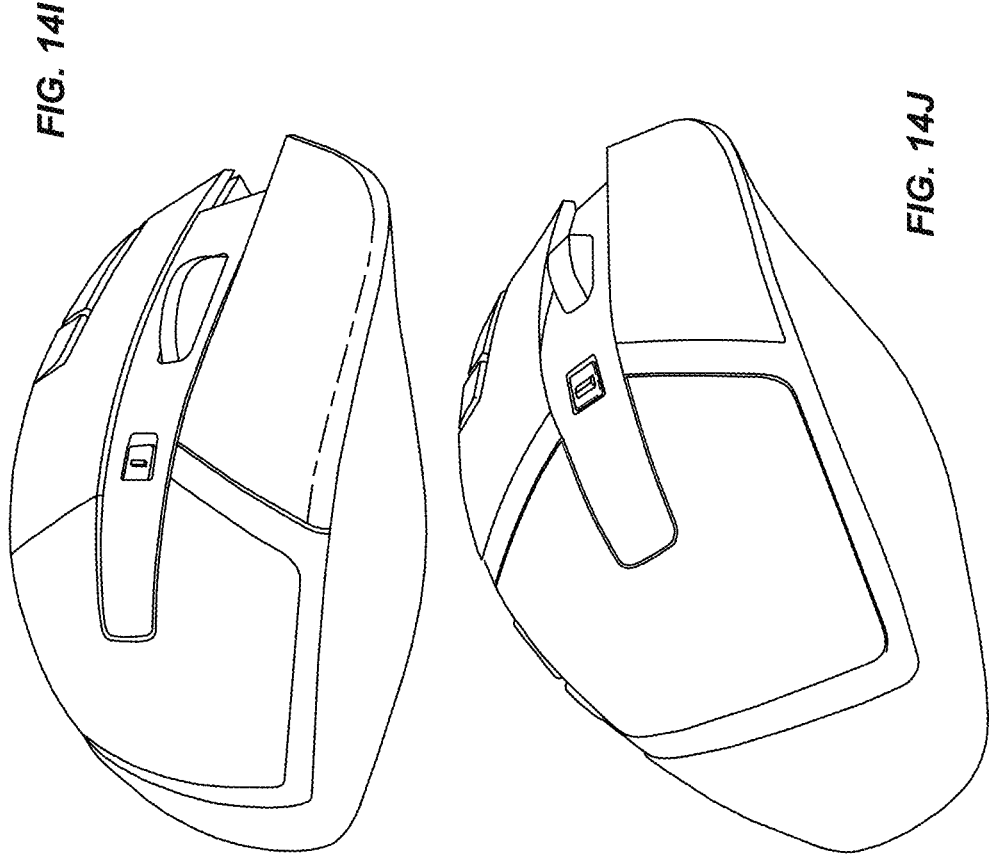
FIG. 14I
FIG. 14J
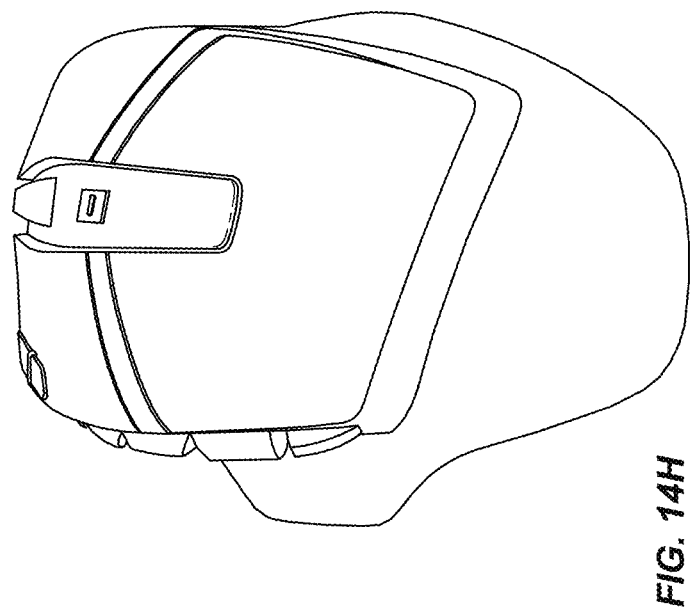
FIG. 14H

ZONAL INPUT DEVICE

CROSS-REFERENCES TO RELATED APPLICATIONS

This present application claims priority to U.S. Patent Application No. 61/870,148, filed Aug. 26, 2013 entitled "Zonal Input Device," which is hereby incorporated by reference in its entirety for all purposes.

BACKGROUND

Input devices are common accessories and can be found in most contemporary computing devices. Input devices can include computer mice, touch pads, joysticks, track balls, keyboards, key pads, remote controls, and more. Computer mice have evolved over the years with many added features, functionality, and ergonomic enhancements.

Some of the common features found in many modern computer mice include wireless communication protocols, scroll wheels that function in multiple axes, multiple buttons that are thumb and/or finger accessible, and touch sensitive, two-dimensional touch surfaces that can provide greater input capabilities, such as touch gestures (e.g., swipes, circular patterns, etc.) that would not otherwise be possible with standard mechanical buttons.

Input devices can be ergonomically designed for long term comfort. For example, the body of the input device (e.g., computer mouse) can include body contours that optimally support a user's hand and can reduce common aches and pains associated with long term use, as well as aid or reduce chronic symptoms that may be caused by medical conditions, such as carpal tunnel syndrome.

While many modern input devices are well equipped to meet the needs of the typical computer user, few can meet the high standards and precision performance required by some gamers. For competitive gamers, any delay that may be attributed to their input device, be it a mechanical inefficiency, a non-optimal ergonomic configuration, or a processing delay, can dictate the difference between winning and losing.

Thus, high end gaming input devices are expected to offer high performance, high precision, and customization options so that gamers can maximize their efficiency. In computer mice, for example, a feature that may improve a user's efficiency can include optional weights to change the center of gravity and weight distribution of an input device to accommodate personal taste. Some mice are tethered to reduce or eliminate the processing time typically associated with wireless communication. Some input devices feature arrays of buttons (mechanical or touch sensitive) to allow a user to input many different commands with a single hand. Despite these myriad developments in input device technology, further improvements are needed to enhance the user experience.

BRIEF SUMMARY

In certain embodiments, a computer mouse includes a chassis to provide support for a user's hand, where the chassis includes a knuckle support region, a palm support region, a first side region having a first ledge to support a thumb, a second side region having a second ledge to support one or more of a pinky or ring finger, and one or more buttons in a frontal region to support one or more of a tip of an index finger or middle finger. Each region is physically separated from one another on the surface of the chassis by a gap. In some embodiments, the regions are "zones."

The knuckle support region can include a coating or covering on a surface of the knuckle support region to provide a directionally dependent friction. The friction on the surface of the knuckle support region is designed to be higher for side-to-side movements (e.g., movement toward the first side and/or second side regions) than for front-to-back movements (e.g., movement toward the frontal region and/or the palm region).

In some embodiments, the first side region includes a coating or covering on a surface of the first side region. The second side region can include a coating or covering on a surface of the second side region, and the friction on both the first side region and the second side region can be higher for upward movements than downward movements due to the frictional properties of the coating or covering. In some implementations, the palm region includes a stick-resistant or non-stick coating or covering. The at least one button of the one or more buttons can include a coating to improve non-stick and fingerprint resistant properties of the at least one button.

In certain embodiments, a method of manufacturing a chassis for an input device includes generating a use map or heat map indicating points of contact between a top surface of the chassis and a user's hand, where each of the points of contact indicate a relative amount of time that the user's hand made contact to that particular point of contact over a period of time. The method further includes identifying the points of contact of the input device that was in contact with the user's hand for longer than a predetermined time, associating adjacent identified points of contact with each other to form regions, identifying areas on the surface of the chassis outside of the regions, and forming the chassis to include the regions, wherein at least one region on the surface of the chassis is completely separated and independent from the other regions by a gap. The gap can be formed on the surface of the chassis in an area outside of the at least one region.

In further embodiments, the regions can include a knuckle support region to support an area under the knuckles of an index finger and middle finger of the user's hand, and a palm support region to support an area under the palm of the user's hand. Further still, the regions can include a first side region to support a thumb of the user's hand, a second side region to support one or more of pinky or ring finger of the user's hand, and a button region to support one or more of a tip of the index finger or middle finger of the user's hand. In some cases, each region is structurally independent from one another such that an external force applied to a surface of one region is not translated to a surface on an adjacent region. The spacing between each region can be determined, in part, on heat dissipation properties of each of the regions.

In certain embodiments, an input device includes a chassis to provide support for a hand. The chassis can include a knuckle support region, and a palm support region, where portions of the chassis between each region are physically separated from one another by a gap. The chassis can further include a first side region to support a thumb, a second side region to support one or more of a pinky or ring finger, and one or more buttons disposed on or integrated with the chassis. The first side region can include a first ledge to support the thumb. The second side region can include a second ledge to support the one or more of the pinky or ring finger.

In some implementations, the knuckle support region includes a coating or covering on a surface of the knuckle support region to provide a directionally dependent friction, where the friction on the surface of the knuckle support region is designed to be higher for side-to-side movements than for front-to-back movements. In some cases, the first side region includes a coating or covering on a surface of the first side region, the second side region includes a coating or covering on a surface of the second side region, and the friction on both the first side region and the second side region is higher for upward movements than downward movements. The palm region can include a stick-resistant coating or covering. Directionally dependent friction can be designed to have substantially more friction in one direction versus another direction. For example, in the knuckle support region, there can be a substantially higher friction for side-to-side movements as compared to front-to-back movements. This can ensure that a user's hand maintain a secure hold on the input device without shifting side-to-side, yet still allows a user to slide their hand forward and/or backwards to accommodate their grip style (e.g., the manner in which they hold the input device).

In certain embodiments, a computer mouse includes a chassis to provide support for a user's hand, where the chassis includes a knuckle support region, a palm support region, a first side region having a first ledge to support a thumb, a second side region having a second ledge to support one or more of a pinky or ring finger, and one or more buttons in a frontal region to support one or more of a tip of an index finger or middle finger. Portions of the chassis between each region can be removed such that each support region of the chassis is physically separated from one another.

In certain embodiments, a method of manufacturing a chassis for an input device, the method including generating a use map or heat map indicating points of contact between a top surface of the chassis and a user's hand, where each of the points of contact indicate a relative amount of time that the user's hand made contact to that particular point of contact over a period of time. The method further includes identifying the points of contact of the input device was in contact with the user's hand for longer than a predetermined time, associating adjacent identified points of contact with each other to form regions, identifying areas on the surface of the chassis outside of the regions, and removing at least a portion of the identified regions from the top surface of the chassis such that each region is physically separated from one another on the top surface of the chassis.

In certain embodiments, an input device includes a chassis to provide support for a hand. The chassis can include a knuckle support region, and a palm support region, where portions of the chassis between each region are removed such that each support region of the chassis is physically separated from one another.

BRIEF DESCRIPTION OF THE DRAWINGS

FIG. 14D is a left side view of an input device, according to certain embodiments of the invention.

FIG. 14E is a right side view of an input device, according to certain embodiments of the invention.

FIG. 14F is a front view of an input device, according to certain embodiments of the invention.

FIG. 14G is a back view of an input device, according to certain embodiments of the invention.

FIG. 14H is a perspective view of an input device, according to certain embodiments of the invention.

FIG. 14I is a perspective view of an input device, according to certain embodiments of the invention.

FIG. 14J is a perspective view of an input device, according to certain embodiments of the invention.

DETAILED DESCRIPTION

Embodiments of the invention are generally directed to systems and methods for enhancing performance characteristics of an input device.

Figure 1:
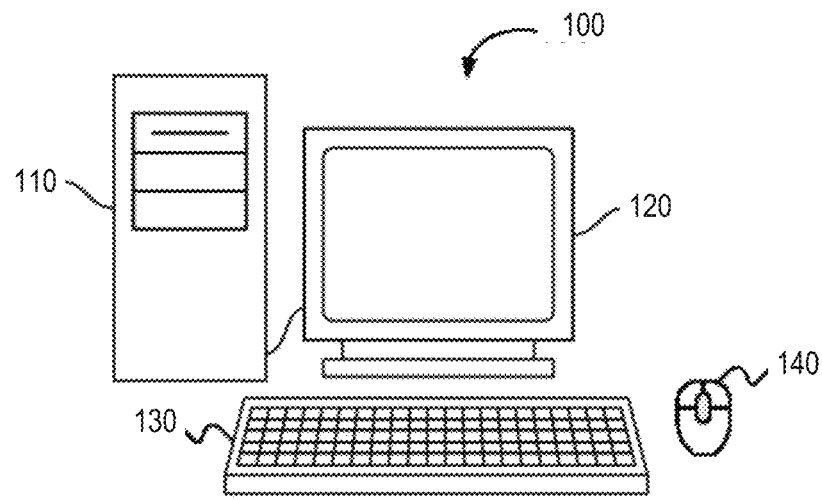
FIG. 1 is a simplified diagram illustrating aspects of computer system with an input device, according to certain embodiments of the invention.

FIG. 1 is a simplified schematic diagram of a computer system 100, according to certain embodiments of the present invention. Computer system 100 includes computer 110, monitor 120, keyboard 130, and input device 140. In one embodiment, input device 140 can be a computer mouse, a remote control device, a game controller, a mobile device, or any other suitable device that can be used to convert analog input signals into digital signals for computer processing. For computer system 100, input device 140 can be configured to control various aspects of computer 110 and monitor 120.

In some embodiments, input device 140 can be configured to provide control signals for movement tracking (e.g., x-y movement on a planar surface), touch/gesture detection, lift detection, orientation detection, power management methods, customization controls for ergonomic adjustments and contour customization, and a host of additional features that would be appreciated by one of ordinary skill in the art with the benefit of this disclosure. Computer 110 may include a machine readable medium (not shown) that is configured to store computer code, such as mouse driver software, keyboard driver software, and the like, where the computer code is executable by a processor (not shown) of the computer 110 to affect control of the computer 110 by input device 140 and keyboard 130. The various embodiments described herein generally refer to input device 140 as a computer mouse or similar input device, however it should be understood that input device 140 can be any input/output (I/O) device, user interface device, control device, input unit, or the like.

Figure 2:
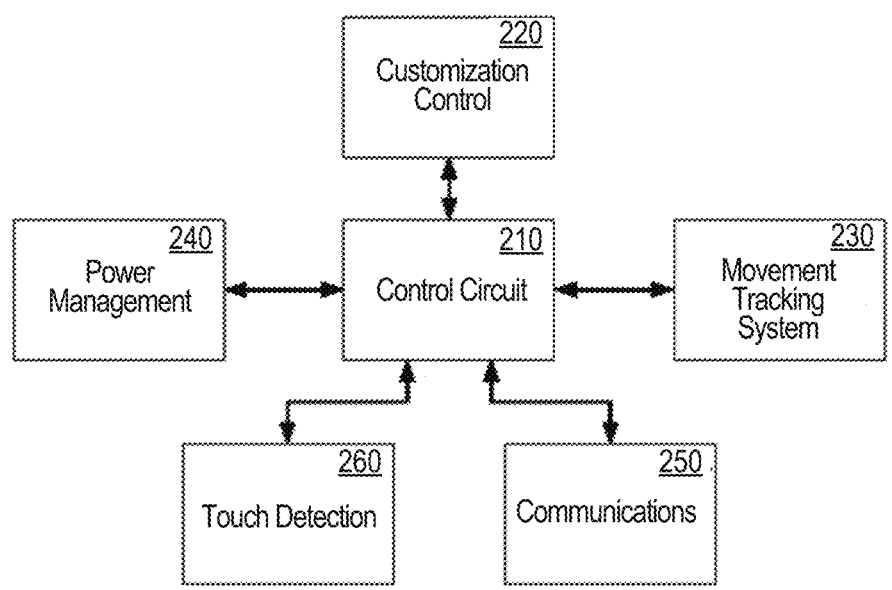
FIG. 2 is a simplified block diagram of a system configured to operate an input device, according to certain embodiments of the invention.

FIG. 2 is a simplified block diagram of a system 200 configured to operate input device 140, according to some embodiments of the invention. System 200 includes control circuit 210, customization control block 220, movement tracking system 230, power management system 240, communication system 250, and touch detection system 260. Each of the system blocks 220-260 can be in electrical communication with the control circuit 210. System 200 may further include additional systems that are not shown or discussed to prevent obfuscation of the novel features described herein.

In certain embodiments, control circuit 210 comprises one or more microprocessors (μCs) and can be configured to control the operation of system 200. Alternatively, control circuit 210 may include one or more microcontrollers (MCUs), digital signal processors (DSPs), or the like, with supporting hardware and/or firmware (e.g., memory, programmable I/Os, etc.), as would be appreciated by one of ordinary skill in the art with the benefit of this disclosure. Alternatively, MCUs, μCs, DSPs, and the like, may be configured in other system blocks of system 200. For example, customization control block 230 may include a local processor to control the customization processes described herein (e.g., shape memory polymer control, etc., as further described below). In some embodiments, multiple processors may provide an increased performance in system 200 (e.g., speed and bandwidth). It should be noted that although multiple processors may improve system performance, they are not required for standard operation of the embodiments described herein.

Customization control block 220 can include one or more sub-systems that can be configured to control various aspects of the ergonomic systems and comfortable region(s) that can be disposed on input device 140. For example, some embodiments may control a heater element in a shape memory polymer (SMP) system. Customization control block 220 may be a discrete system utilizing a local processing device, or may be integrated or subsumed in control circuit 210. Some or all of the customization control systems can be included in a single embodiment, or multiple embodiments, as required by design. The ergonomic systems and conformable regions that may utilize these control mechanisms are further discussed below.

Movement tracking system 230 is configured to track a movement of input device 140, Movement tracking system 240 can use optical sensors such as light-emitting diodes (LEDs) or an imaging array of photodiodes to detect a movement of input device 140 relative to an underlying surface. Input device 140 may optionally comprise movement tracking hardware that utilizes coherent (laser) light. In certain embodiments, one or more optical sensors are disposed on the bottom side of input device 140 (not shown). Movement tracking system 230 can provide positional data (e.g., X-Y coordinate data) or lift detection data. For example, an optical sensor can be used to determine when a user lifts input device 140 off of a surface and send that data to control circuit 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine if input device 140 has been lifted off of a surface and provide movement data that can include the velocity, physical orientation, and acceleration of input device 140. In some embodiments, gyroscope(s) can be used in lieu of or in conjunction with accelerometer(s) to determine movement or input device orientation.

Power management system 240 can be configured to manage power distribution, recharging, power efficiency, and the like, for input device 140. In some embodiments, power management system 240 can include a battery (not shown), a USB based recharging system for the battery (not shown), power management devices (e.g., low-dropout voltage regulators—not shown), and a power grid within system 200 to provide power to each subsystem (e.g., accelerometers 220, gyroscopes 230, etc.). In certain embodiments, the functions provided by power management system 240 may be incorporated into the control circuit 210.

Communications system 250 can be configured to provide wireless communication with the computer 110, or other devices and/or peripherals, according to certain embodiment of the invention. Communications system 250 can be configured to provide radio-frequency (RF), Bluetooth, infrared, or other suitable communication technology to communicate with other wireless devices. System 200 may comprise a hardwired connection to computer 110. For example, input device 140 can be configured to receive a Universal Serial Bus (USB) cable to enable bi-directional electronic communication with computer 110 or other external devices. Some embodiments may utilize different types of cables or connection protocol standards to establish hardwired communication with other entities.

In some embodiments, touch detection system 260 can be configured to detect a touch or touch gesture on one or more touch sensitive surfaces on input device 140. Touch detection system 260 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can be configured to detect at least one of changes in the received signal, the presence of a signal, or the absence of a signal. Furthermore, a touch sensor may include a source for emitting the detected signal, or the signal may be generated by a secondary source. Touch sensors may be configured to detect the presence of an object at a distance from a reference zone or point, contact with a reference zone or point, or a combination thereof. Certain embodiments of input device 140 may not utilize touch detection or touch sensing capabilities.

Various technologies can be used for touch and/or proximity sensing. Some examples of include, but are not limited to, resistive (e.g., standard air-gap 4-wire based, based on carbon loaded plastics which have different electrical characteristics depending on the pressure (FSR), interpolated FSR, etc.), capacitive (e.g., surface capacitance, self-capacitance, mutual capacitance, etc.), optical (e.g., infrared light barriers matrix, laser based diode coupled with photodetectors that could measure the time of flight of the light path, etc.), acoustic (e.g., piezo-buzzer coupled with some microphones to detect the modification of the wave propagation pattern related to touch points, etc.), although other methods of detection may be incorporated.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in control circuit 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., shape memory polymer heater control, etc.) as described herein.

It should be appreciated that system 200 is illustrative and that variations and modifications are possible. System 200 can have other capabilities not specifically described here (e.g., mobile phone, global positioning system (GPS), power management, one or more cameras, various connection ports for connecting external devices or accessories, etc.). Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 200 may be combined with or operated by other sub-systems as required by design. For example, customization control block 220 may operate within control circuit 210 instead of functioning as a separate entity. Moreover, it should be understood that the various embodiments of surface regions discussed herein can be of any size, shape, color, texture, etc., and can be applied to any input device (e.g., input device 140), at any preferred location and in any desired configuration.

Figure 3:
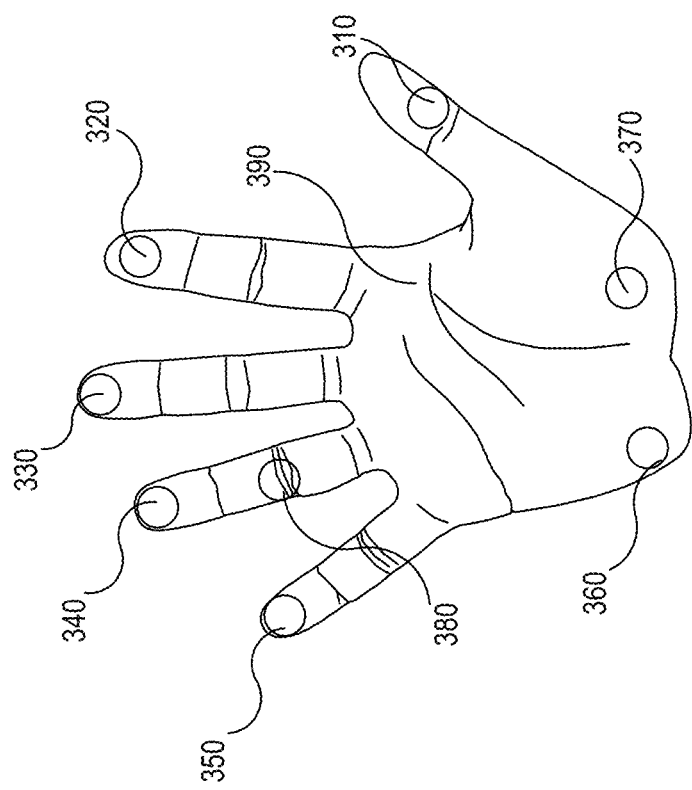
FIG. 3 is an image illustrating aspects of preferred ergonomic characteristics as applied to an input device, according to certain embodiments of the invention.

FIG. 3 is an image 300 illustrating aspects of preferred ergonomic characteristics as applied to an input device, according to certain embodiments of the invention. The image shows features of a hand and the various ergonomic requirements thereof, including its position on a mouse (e.g., gaming mouse), the action typically required by a particular finger (e.g., fast clicking, weight distribution, lifting, etc), and certain preferred characteristics of an input device with respect to the particular fingers or portions of the hand. By accommodating these ergonomic requirements, a user can experience greater comfort, prolonged use without fatigue, greater control of the input device, improved reliability and consistency, and a host of other attributes that would be desirable by a user—particularly for gamers or other users that may utilize an input device for an extended period of time or may have precise and exacting control requirements in their particular application. Although FIG. 3 and the information therein is directed to a person's right hand, the same requirements and input device specifications can be applied to left-handed input devices or even left/right hand neutral device. In some embodiments, the ergonomic requirements of FIG. 3 can be incorporated into input device 140.

Referring to FIG. 3, the features described include the thumb 310, index finger 320, middle finger 330, ring finger 340, little finger (pinky) 350, outer palm 360, inner palm 370, ring finger knuckle 380 and trigger knuckles 390. The thumb 310 may reside in a thumb scoop (e.g., on input device 140) and may actuate buttons on a gaming mouse or other suitable input device. An example of a thumb scoop and thumb buttons are shown in FIGS. 14A-J. On a gaming mouse, thumb 310 typically performs actions including grip (e.g., to secure the mouse), movement (e.g., for changing thumb position), clicking thumb buttons, lifting (repositioning the mouse), orientation, and the like. Some requirements of thumb 310 include thumb support, non-slip characteristics, heat dissipation properties (e.g., to reduce sweating), breathability (e.g., to reduce sweating), and hygenic properties (e.g., to prevent bacteria, mold, etc., from growing as a result of sweat, heat, etc.).

The index finger 320 may be positioned to actuate a left trigger button and/or index buttons of the input device 140. On a gaming mouse, index finger 320 typically performs highly frequent clicking and requires mouse characteristics that accommodate high speed clicking, consistency, assured reliable performance, and positioning such that the tip of the index finger is centered over the switch for efficient actuation. These characteristics are typically important to competitive gamers since they perform hundreds, if not thousands, of clicks during the course of a game and require exacting performance characteristics that they can count on for a competitive edge.

The middle finger 330 may be positioned to actuate a right trigger button, according to certain embodiments. On a gaming mouse, middle finger 330 typically performs highly frequent clicking and, like the index finger 320, requires mouse characteristics that accommodate high speed clicking, consistency, assured reliable performance, and positioning such that the tip of the index finger is centered over the switch for efficient actuation.

The ring finger 340 may be positioned to rest on the right side of the input device 140, according to certain embodiments. On a gaming mouse, ring finger 340 typically performs lifting actions, skating actions, orientation, and grip actions. Lifting actions may occur, e.g., when the user lifts input device 140 to move it to a different position. Skating actions include lifing and moving a mouse. Orientation can include orienting the hand with respect to the input device while its in use. A grip action can include securing input device 140 with the index finger in conjunction with one or more of the thumb 310 and little finger 350. Some requirements for ring finger 340 on input device 140 can include non-slip characteristics, an optimal surface area on input device 140, a lifting platform on input device 140, and positioning such that ring finger 340 does not drag on the table during use.

The little finger ("pinky") 350 may be positioned to rest on the right side of the input device 140, according to certain embodiments. On a gaming mouse, ring finger 340 typically performs lifting actions, skating actions, orientation, and grip actions. Some requirements for little finger 350 on input device 140 can include non-slip characteristics, and positioning such that little finger 350 does not drag on the table during use.

The outer palm 360 may be positioned on a palm zone of input device 140, according to certain embodiments. On a gaming mouse, the palm zone typically controls hand weight distribution on the input device, hand orientation on the input device, and typically rests on the input device 140. Some requirements for outer palm 360 on input device 140 can include a rest location, extended comfort for long periods of use, heat dissipation properties (e.g., to reduce sweating), breathability (e.g., to reduce sweating and added comfort), hygenic properties (e.g., to prevent bacteria, mold, etc., from growing as a result of sweat, heat, etc.), reduced wear of the palm region of the input device from long term use, and assured grip.

The inner palm 370 may be positioned on a palm zone of input device 140, according to certain embodiments. On a gaming mouse, the palm zone typically controls hand weight distribution on the input device, hand orientation on the input device, and typically rests on the input device 140 in the palm region. Some requirements for inner palm 370 on input device 140 can include a rest location, extended comfort for long periods of use, heat dissipation properties (e.g., to reduce sweating), breathability (e.g., to reduce sweating and added comfort), hygenic properties (e.g., to prevent bacteria, mold, etc., from growing as a result of sweat, heat, etc.), reduced wear of the palm region of the input device from long term use, and assured grip.

The ring finger knuckle 380 may be positioned to rest on the right side or right edge of input device 140, according to certain embodiments. On a gaming mouse, ring finger knuckle 380 typically performs pushing actions on input device 140 or rests on the right edge for stability. Some requirements for ring finger knuckle 380 can include a surface to rest, non-slip characteristics, and non-edge contact.

The trigger knuckle 390 may be positioned on the knuckle rest (e.g., knuckle support region) of input device 140, according to certain embodiments. On a gaming mouse, trigger finger knuckle 390 typically performs actions corresponding to hand orientation, hand weight distribution, and movements to control the poise or configuration of a user's trigger fingers (e.g., index finger 340 and middle finger 330). Some requirements for trigger finger knuckle 380 can include an assured grip and contact, control to ensure the trigger fingers are correctly angled, heat dissipation properties, and reduced wear from long term use.

Figure 4:
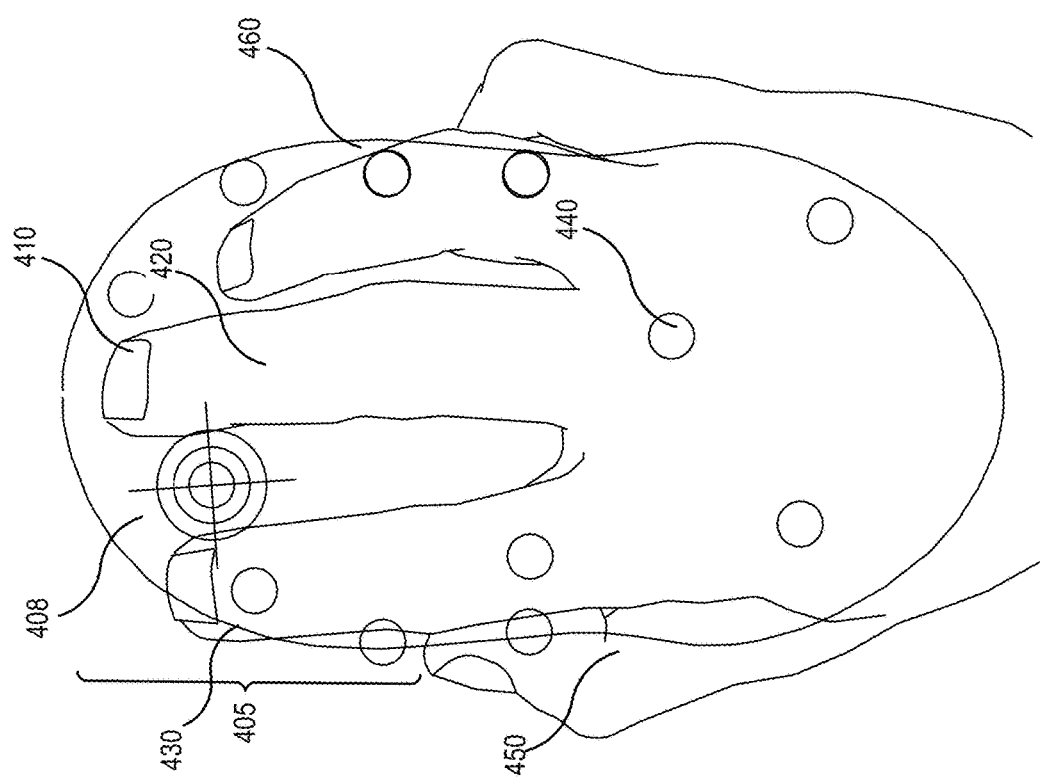
FIG. 4 is an image illustrating aspects of ergonomic features of an input device, according to certain embodiments of the invention.

FIG. 4 is an image illustrating aspects of ergonomic features of an input device 400, according to certain embodiments of the invention. Device 400 can include a button region 405 including one or more buttons (e.g., left/right triggers) 408/410, a scroll wheel 420, a chassis 430, a knuckle support region 440, a first side region 450 (e.g., including thumb scoop), a second side region 460 (e.g., including right ridge), a palm support region 470 (e.g., palm rest), and more, as shown. Input device 400 can be a computer mouse or other suitable input device, as described in relation to input device 140.

In some embodiments, chassis 430 may be comprised of a single body or multiple bodies that are interconnected (e.g., outer chassis and inner chassis). Chassis 430 can be a frame or housing. The chassis can have multiple regions, including but not limited to, a knuckle support region, a palm support region, a left side region including a first ledge configured to support the user's thumb, a right side region including a second ledge configured to support one or more of a pinky or ring finger, and a button region having one or more buttons disposed on or integrated with the chassis. In some implementations, the multiple regions are located and accessible by a user on the upper surface of the input device 400. Although FIG. 4 depicts a particular input device 400 configured for a right-handed user, the concepts described herein can be applied to a left-handed mouse, a universal mouse (right or left handed use), and even other input devices that are not necessarily computer mice, but could implement the ergonomic concepts described herein.

The chassis can include multiple regions such that the different regions are separate (e.g., separated by a gap). For example, in certain embodiments, portions of the chassis between each region are removed such that each support region of the chassis is physically separated from one another. Separate regions are less likely to translate deflection, deformation, or more generally, kinetic energy from one region to the next. Such embodiments may exhibit more stable physical performance characteristics. Furthermore, removing chassis material can improve heat dissipation characteristics, reduce weight, reduce manufacturing material requirements, reduce manufacturing costs, and more. In some embodiments, the chassis can have internal and external portions, where the external chassis portions are separated (e.g., knuckle support region, palm support region, etc.) and the internal chassis portion remains connected to each region to maintain core integrity. Some of the different regions can be separate and some can be integrated. For example, some embodiments may have the knuckle support region and side support regions separated, but the palm support region may be joined with (i.e., contiguous with) the knuckle support region. It should be understood that any combination or permutation of chassis separation can be used, and the embodiments depicted and described herein are not limiting or all inclusive. Some embodiments may only have one or two regions separated at the surface of the input device, while others may separate all of them. These examples and further implementations would be appreciated by one of ordinary skill in the art with the benefit of this disclosure.

In some embodiments, gaps are formed between one or more regions, rather than removed, at the time of manufacturing. For example, some chassis may be die cast, injection molded, or other suitable form of manufacturing, to include the gaps between the one or more separated and independent regions described herein. One of the regions, some of the regions, or all of the regions can be formed to be separate and independent from the other regions. They can be independent only at the surface of the chassis, they can be completely independent both at the surface and throughout the chassis, or some combination thereof. The gaps can be formed by removing material, or the gaps can be manufactured at the time of formation (i.e., not removed), as discussed above. The gaps can be of any suitable width, and some gaps may be wider than others. Some gaps may have different widths at different locations on a particular region. For example, a gap between the palm support region and the knuckle support region may be larger than a gap between the palm support region and the left side region. Some embodiments may only include one region that is separated and independent from the other regions. Others may have several separate and independent regions. The many combinations, permutations, and applications of the separated regions (and how they are separated—i.e., at the surface, throughout the chassis, etc.) would be appreciated by one of ordinary skill in the art with the benefit of this disclosure. As discussed above, some of the advantages of having independent regions include allowing different treatments for each region (e.g., coatings, coverings, aesthetics), different materials for each region, greater strength and mechanical separation such that deformations for forces on one region may not translate to a separate region, better heat dissipation characteristics, and more. It should be noted that all of the embodiments described herein, as well as their associated inventive concepts can be mixed and matched in any suitable combination as required by design.

Palm support region 470 can include a single region or multiple regions (e.g., 2 regions) to support the thenar (inner palm) and hyper thenar areas (outer palm) independently. Palm support region 470 supports a user's palm and can be used to control hand weight distribution, hand orientation, and a place to rest the palm. The inner palm rest of palm support region 470 (i.e., thenar rest) can be a convex support surface and may be contoured to transition into the thumb area. The outer palm support area (hyper thenar rest) can provide pinky knuckle support and can be contoured to seamlessly transition from the trigger knuckle region.

Some requirements for inner palm portion of palm region 470 can include a rest location, extended comfort for long periods of use, heat dissipation properties (e.g., to reduce sweating), breathability (e.g., to reduce sweating and added comfort), hygenic properties (e.g., to prevent bacteria, mold, etc., from growing as a result of sweat, heat, etc.), reduced wear of the palm region of the input device from long term use, and assured grip.

As discussed above, the outer palm 360 typically controls hand weight distribution on the input device, hand orientation on the input device, and typically rests on the input device 140. Some requirements for outer palm portion of palm region 470 can include a rest location, extended comfort for long periods of use, heat dissipation properties (e.g., to reduce sweating), breathability (e.g., to reduce sweating and added comfort), hygenic properties (e.g., to prevent bacteria, mold, etc., from growing as a result of sweat, heat, etc.), reduced wear of the palm region of the input device from long term use, and assured grip.

In some embodiments, palm support region 470 can include a coating or covering to improve its heat dissipation and hand contacting properties. In many cases, relatively large amounts of heat are generated by hand/palm contact due to the surface area contact and force applied to the region. By improving heat dissipation properties, long term user comfort can be improved. Some embodiments may employ a coating or covering to improve the contact between the user's hand and the mouse to prevent slippage. For example, Teflon PTFE can be used on the palm support region (and other regions) to improve these properties. In some embodiments, anti-stick coatings can be used. Other coatings and covering can be used to achieve these properties as would be appreciated by one of ordinary skill in the art with the benefit of this disclosure.

In certain embodiments, shape memory polymers (SMP) can be used in the palm support region (and other regions) to allow a user to customize the feel and contour of the mouse. Some SMP materials also exhibit improve heat dissipation characteristics and no no-slip properties. FIGS. 9-12 illustrate various embodiments that employ and integrate SMP technologies.

Knuckle support region 440 can be configured to support a user's knuckles (e.g., trigger finger knuckles) which can be used to leverage finger movement. Excellent knuckle support can enable fast and precise button articulation. The knuckle support can include a coating or covering on its surface to provide directional or direction-dependent frictional properties. Good computer mouse control typically calls for freedom of movement for the knuckles in front-to-back movements and little to no movement in the left-right movements. This is because front-to-back movement and repositioning of fingers are typically common (e.g., typically related to button access), but side-to-side movement typically promotes instability in the hand/mouse connect. Thus, in certain embodiments, the friction on the surface of the knuckle support region is higher for side-to-side movements than for front-to-back movements due to aspects of the coating and/or covering that provide for differing amounts of friction depending on the direction of the force applied to the knuckle support region. In some cases, the friction for side-to-side movements on the surface of the knuckle support region can be significantly higher than for front-to-back movements on its surface, which may experience perceptibly little friction. The coating or covering can also improve heat dissipation characteristics or provide aesthetically preferred properties (e.g., textures, designs, contours, etc.). In some cases, knuckle support region 440 includes an arch high point directly below the placement of a user's knuckles. Thus, the surface can accommodate pronation and provides a flowing and contoured transition to the other regions of input device 400.

The left side region (e.g., first side) 450 and right side regions (e.g., second side) 460 can employ designs that promote good mouse control and stability. Lifting and moving a mouse (i.e., "skating") may frequently occur for repeated or long movements in one direction. For example, when a user moves a mouse to the edge of a mouse pad, the user typically picks up the mouse and re-centers it in the middle of the mouse pad to continue the movement. Thus, upward forces on the sides of the mouse should exhibit higher amounts of friction to promote good contact with the fingers/thumb for easy lifting or skating. In contrast, repositioning one's hand on the mouse may be common and can include moving the thumb/hand downward with respect to the left/right sides (e.g., in changing mouse grip styles). As such, direction frictional properties are employed in the left side 450 and right side regions 460, according to certain embodiments of the invention. Improved frictional properties (i.e., direction dependent friction) can be implemented by including a coating or covering on their respective surfaces, where the friction on the surface of the left side and right side regions is higher for upward movements than for downward movements. In certain implementations, the left side region includes a coating or covering on a surface of the left side region, the right side region includes a coating or covering on a surface of the right side region, and the friction on both the left side region and the right side region is higher for upward movements than downward movements. In some cases, the first side region includes a first ledge to support the thumb, and the second region includes a second ledge to support one or more of the little finger or ring finger.

In some embodiments, button region 405 can have one or more buttons 408/410 to support one or more of a tip of an index finger or middle finger, the one or more buttons disposed on or integrated with the chassis. The one or more buttons can include a coating or covering to improve non-stick and fingerprint resistant properties. In some cases, the coating resists absorption or collection of oils from a user's hand. These properties help maintain performance characteristics of the buttons over long term use. The left button/trigger may have a number of ergonomically preferable properties including a flatter surface for FPS (first person shooter) triggers, a slight concavity right of center of the button, and separation from the right button/trigger to reduce stiffness. The right button/trigger may include a flowing tilted surface for phalanx contact, slight concavity left of center, and may extend further than the left trigger. Button region 405 can include mechanical buttons, touch sensitive regions (e.g., capacitive sensors, resistive sensors, etc.), or other type of button configured to detect a "click," touch, gesture, or the like, on chassis 430.

Input device 400 can include any number of additional properties and features to enhance the user experience, many of which are illustrated in FIGS. 14A-J. For example, additional buttons can be included by the thumb position and near the left/right triggers to provide more control options for the user. In some implementations, the button locations provide for easy blind registration of the button locations, they can provide a subtle ledge to eliminate accidental presses, and may be defined by distinct button edges to help differentiate them without requiring the user to divert their attention to look at the button.

The right side of input device 400 can include an undercut concavity for both pinky and ring finger support, forming a ledge to facilitate grip and lift. Additionally, the right side transition between regions can be contoured in a smooth manner for soft transitions to reduce the number of hard edges. The left side (e.g., first side) includes a thumb scoop that may include a heavy concave surface with a flowing contour or transition to the side buttons, as shown in FIGS. 14A-J. In some embodiments, the thumb scoop can be part of first side region 450.

Smart displays may be integrated in any suitable location on input device 400. In some embodiments, one or more smart displays may be integrated in the top surface of input device 400 in a viewing angle facing the user for quick-glance viewing.

Figure 5:
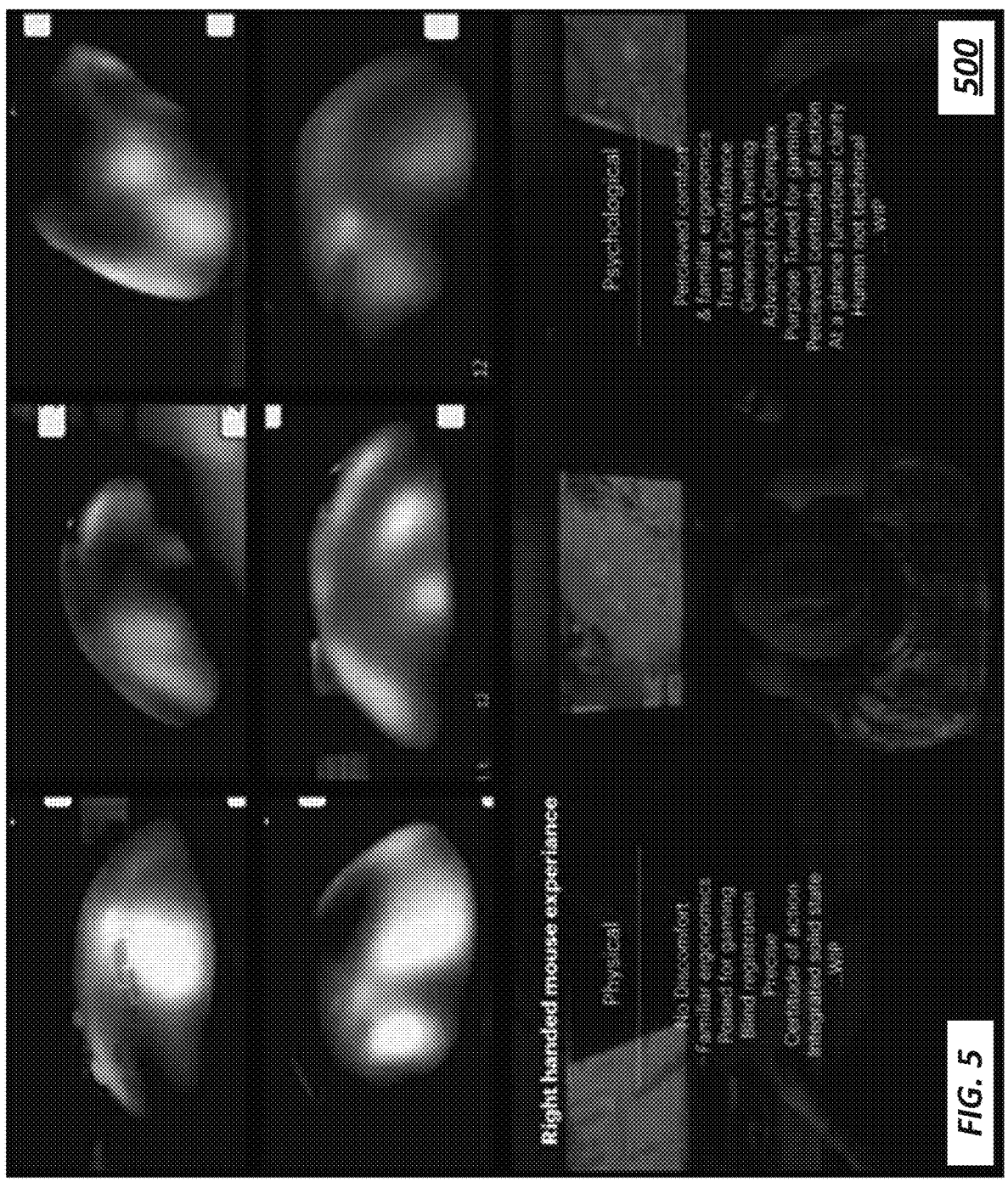
FIG. 5 includes a series of images depicting heat maps for one or more input devices and a number of design characteristics thereof, according to certain embodiments of the invention.

FIG. 5 includes a series of images 500 depicting heat maps for one or more input devices and a number of design characteristics thereof, according to certain embodiments of the invention. The succession of heat maps show an infra-red representation illustrating how a user contacts an input device. Brighter colors (e.g., white, orange) indicate areas where the user had high amount of physical contact with the input device. Darker colors (e.g., black, purple) indicate areas where the user had little to no physical contact with the input device. Based on the heat map signatures, more efficient chassis design can be created. Although the images shown and described show heat maps using infra-red imaging, it should be understood that other methods may be used to indicate time-based contact maps, such as use maps that show relative contact times. That is, use maps that show points of contact between a top surface of the chassis and a user's hand to indicate a relative amount of time that the user's hand made contact to that particular point of contact over a period of time.

Based on the heat map images, various physical and psychological considerations can be effectively addressed and designed into the chassis configuration for input device 400. Some physical and psychological considerations may include comfort, familiar ergonomics, efficient gaming design, blind registration of input device features (e.g., buttons), precision, certitude of action, and more. Thus, ideal chassis configurations can be designed by providing ergonomic support for regions with high user contact, and removing superfluous elements (regions with low levels of user contact) to form a chassis with independent regions that are physically separated from one another on the top surface of the chassis. These heat map characteristics and the associated physical and psychological considerations listed were used, at least in part, in the development of certain embodiments of the invention described herein. Some of the resulting chassis designs based on heat maps for varying user grip configurations (e.g., claw, fingertip, full crown) are shown in FIGS. 6 and 7.

Figure 6:
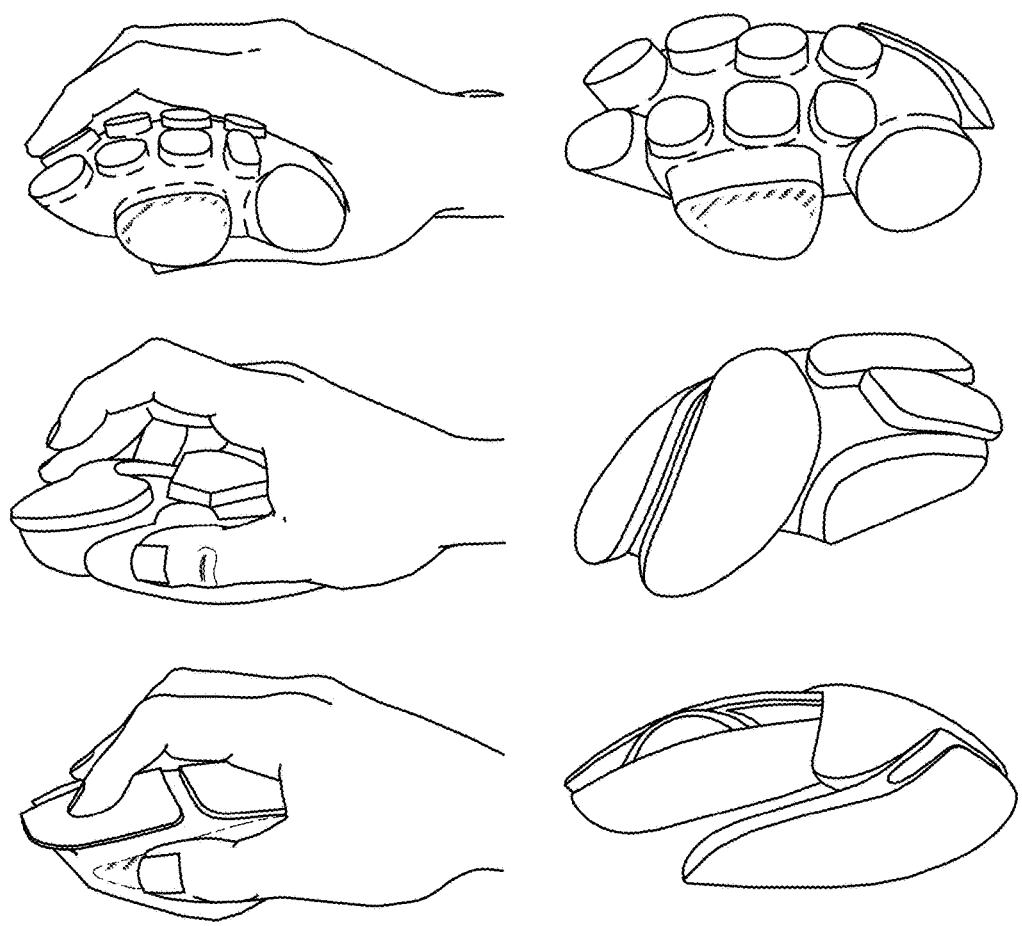
FIG. 6 includes a series of images depicting a number of ergonomically improved input devices including mapping touchpoints based on grip configuration and/or heat mapping signatures, according to certain embodiments of the invention.
Figure 7:
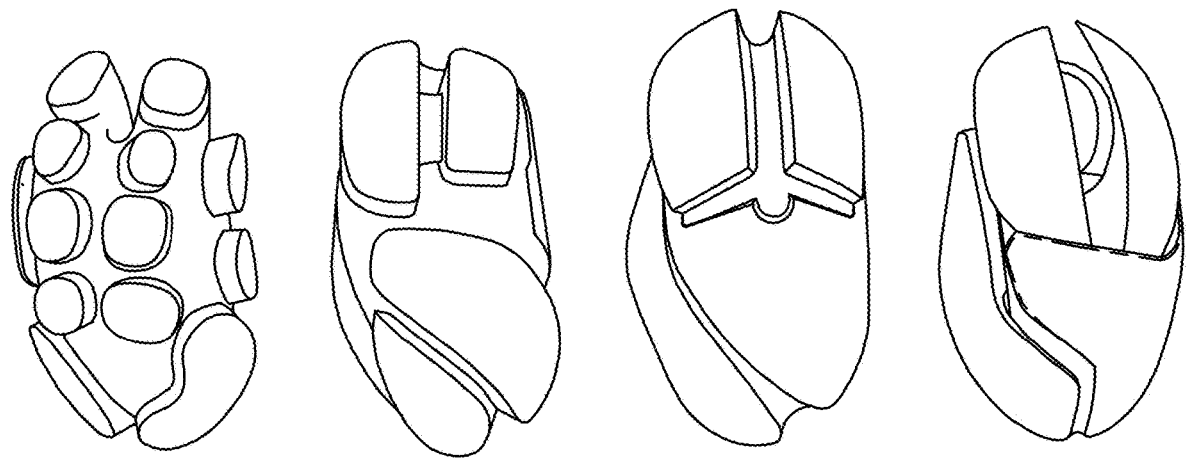
FIG. 7 includes a series of images depicting a number of ergonomically improved input devices including mapping touchpoints based on grip configuration and/or heat mapping signatures, according to certain embodiments of the invention.

FIGS. 6 and 7 includes a series of images depicting a number of ergonomically improved input devices including mapping touchpoints based on grip configuration and/or heat mapping signatures, according to certain embodiments of the invention.

Figure 8:
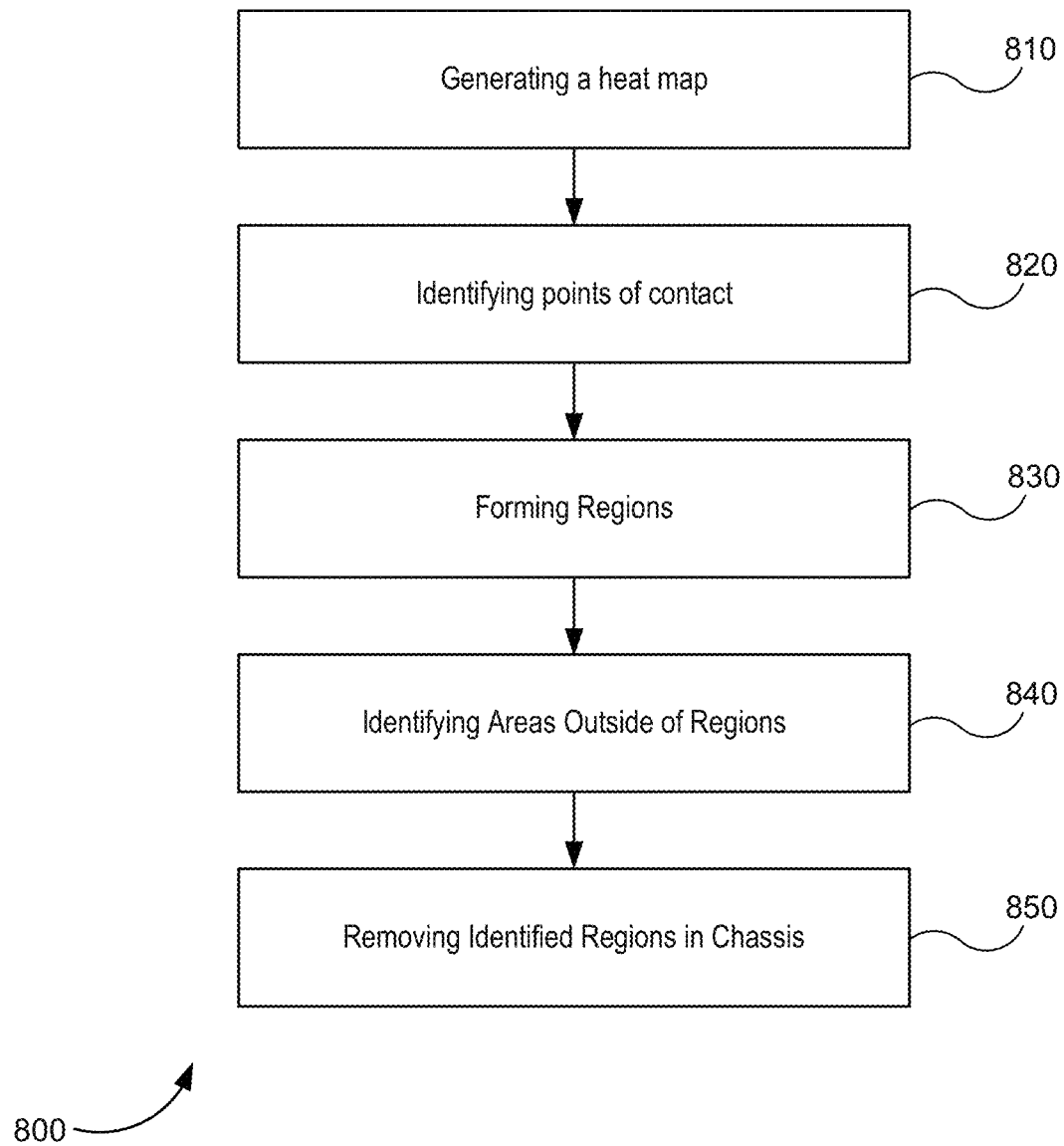
FIG. 8 depicts a simplified flow diagram illustrating aspects of a method of manufacturing a chassis for an input device, according to certain embodiments of the invention.

FIG. 8 depicts a simplified flow diagram illustrating aspects of a method 800 of manufacturing a chassis for an input device, according to certain embodiments of the invention. Method 800 begins generating a use map or heat map indicating points of contact between a top surface of the chassis and a user's hand (810). Each of the points of contact can indicate a relative amount of time that the user's hand made contact to that particular point of contact over a period of time. Thus, a chassis that only supports a user's primary points of contact with the chassis surface can be determined. One example of a heat map is shown in FIG. 5, as discussed above.

At 820, the method continues with identifying the points of contact that the input device was in contact with the user's hand for longer than a predetermined time. For example, use maps can indicate a relative amount of contact time between a hand and the surface of the chassis. Areas with contact occurring over a predetermined time can be selected. Alternatively, heat maps can be used and areas shown in white or bright (e.g., see FIG. 5) to indicate areas having the most user hand contact. At 830, points of contact are associated with each other to form regions. For example, use maps showing points of contact immediately adjacent to one another can be grouped together to form the various regions (e.g., knuckle support region, button region, etc.). Regions can also be formed based on heat maps. For instance, areas with orange or white heat signatures that are surrounded by darker (i.e., colder) areas can be used to form regions. At 840, areas on the surface of the chassis that are outside of the formed regions are identified. In some embodiments, at least a portion of the identified regions from the top surface of the chassis are removed such that each region is physically separated from one another on the top surface of the chassis (850). Alternatively, (850) can include forming the chassis to include the regions, wherein at least one region on the surface of the chassis is completely separated and independent from the other regions by a gap. One of the regions, some of the regions, or all of the regions can be formed to be separate and independent from the other regions. They can be independent at the surface of the chassis, they can be completely independent at the surface and throughout the chassis, or some combination thereof. The gaps can be formed by removing material, or the gaps can be manufactured at the time of formation (i.e., not removed). The gaps can be of any suitable width, and some gaps may be wider than others. Some gaps may have different widths at different locations on a particular region. Some embodiments may only include one region that is separated and independent from the other regions. Others may have several separate and independent regions. The many combinations, permutations, and applications of the separated regions (and how they are separated—i.e., at the surface, throughout the chassis, etc.) would be appreciated by one of ordinary skill in the art with the benefit of this disclosure. As discussed above, some of the advantages of having independent regions include allowing different treatments for each region (e.g., coatings, coverings, aesthetics), different materials for each region, greater strength and mechanical separation such that deformations for forces on one region may not translate to a separate region, and more. It should be noted that all of the embodiments described herein, as well as their associated inventive concepts can be mixed and matched in any suitable combination as required by design.

Some of the regions formed in the chassis can include a knuckle support region to support an area under the knuckles of an index finger and middle finger of the user's hand, a palm support region to support an area under the palm of the user's hand, a first side region to support a thumb of the user's hand, and a second side region to support one or more of pinky or ring finger of the user's hand. In some embodiments, a button region may be formed that can be used to support one or more of a tip of the index finger or middle finger of the user's hand. In some implementations, each region is structurally independent from one another such that an external force applied to a surface of one region is not translated to a surface on an adjacent region. Furthermore, the spacing between each region can be determined, in part, on heat dissipation properties of each of the regions. For example, the amount of spacing between regions may alter the strength, rigidity, heat dissipation properties, and the like, of the different regions of the chassis, as would be appreciated by one of ordinary skill in the art with the benefit of this disclosure.

It should be appreciated that the specific steps illustrated in FIG. 8 provide a particular method of manufacturing a chassis for an input device, according to an embodiment of the present invention. Other sequences of steps may also be performed according to alternative embodiments. In certain embodiments, method 800 may perform the individual steps in a different order, at the same time, or any other sequence for a particular application. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Embodiments Using Shape Memory Polymers

FIGS. 9-12 depict a series of simplified images of input devices utilizing aspects, features, and implementations of incorporating a shape memory polymer (SMP) into various features of input device 400, according to certain embodiments of the invention. SMP can be implemented in a variety of ways including surface-based SMP to provide for a customized surface contour. SMP can also be used as region links (e.g., "muscles") connecting certain regions or sections to the chassis to allow for customizable region placement. In some embodiments, SMP can be used as region links and/or provide customizable contours (i.e., SMP on the region surface) to accommodate a number of different mouse "grips." Some common mouse "grips" include the "claw," the "fingertip," and the "full crown." Each of these grips typically require different features and characteristics. By implementing SMP links and customizable contours, some embodiments can be optimized for each of the different mouse grip styles. The many implementations that can be applied to the various regions of computer mouse would be appreciated by one of ordinary skill in the art with the benefit of this disclosure.

Figure 9:
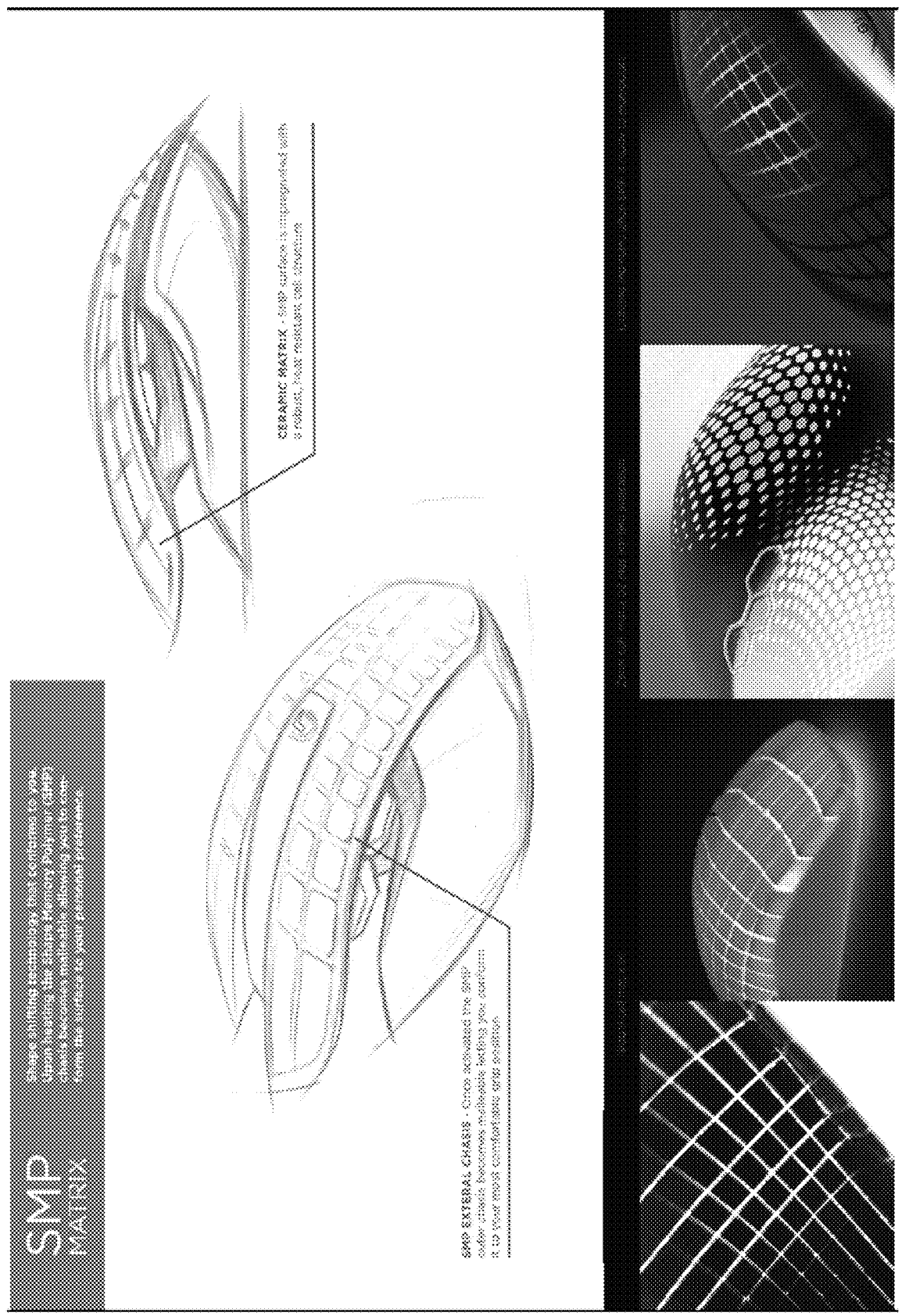
FIG. 9 illustrates several embodiments of chassis that utilizes SMP technology, according to certain embodiments of the invention.

FIG. 9 illustrates several embodiments of chassis that utilizes SMP technology, according to certain embodiments of the invention. When heated, the SMP chassis becomes malleable, allowing a user to conform the surface to a comfortable grip position. In the ceramic matrix shown in FIG. 9, the SMP surface is impregnated with a robust, heat resistant cell structure to provide deformability along the entire top surface of the input device.

Figure 10:
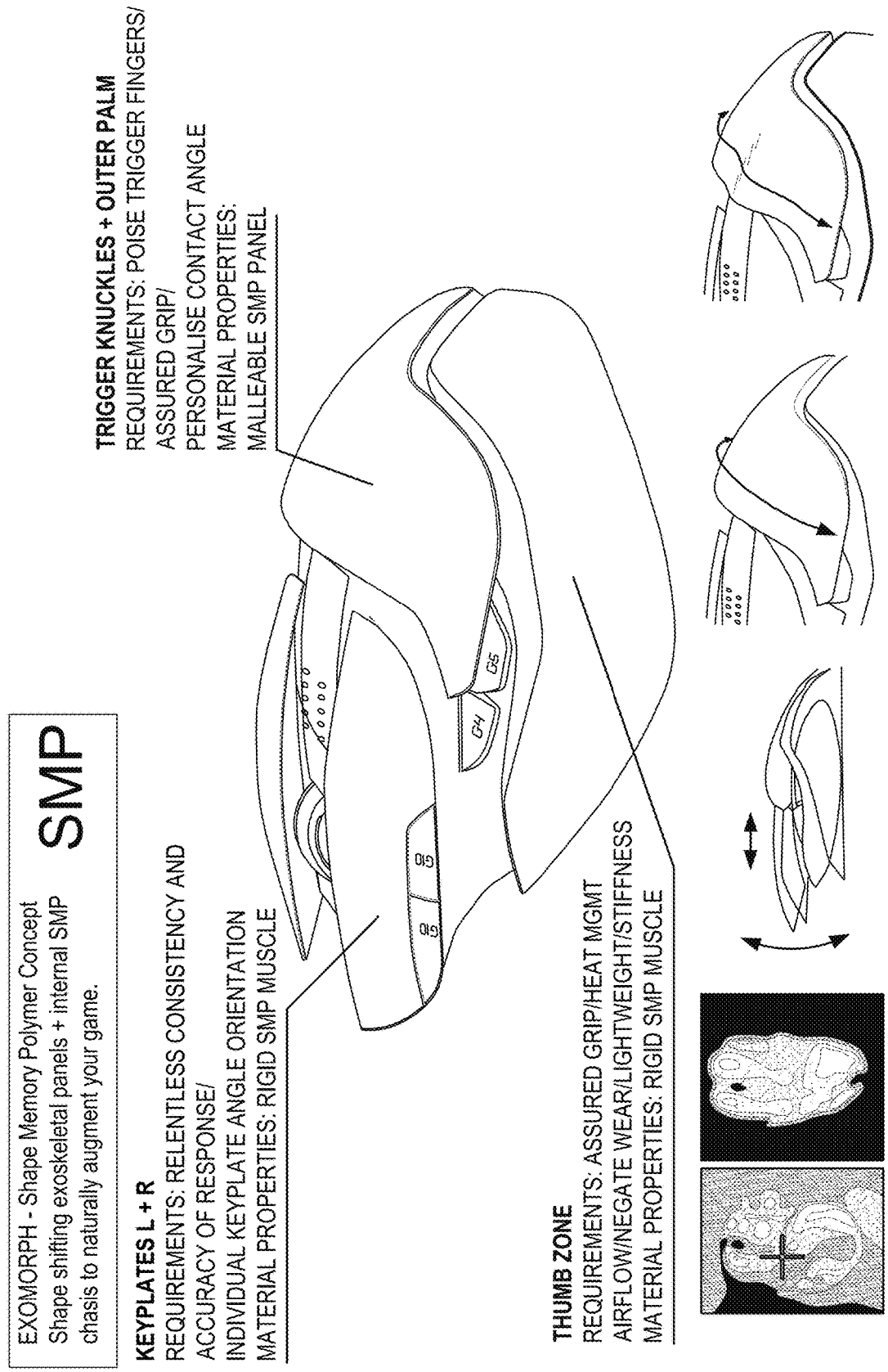
FIG. 10 illustrates input devices with shape shifting exo-skeletal panels and an internal SMP chassis, according to certain embodiments of the invention.
Figure 11:
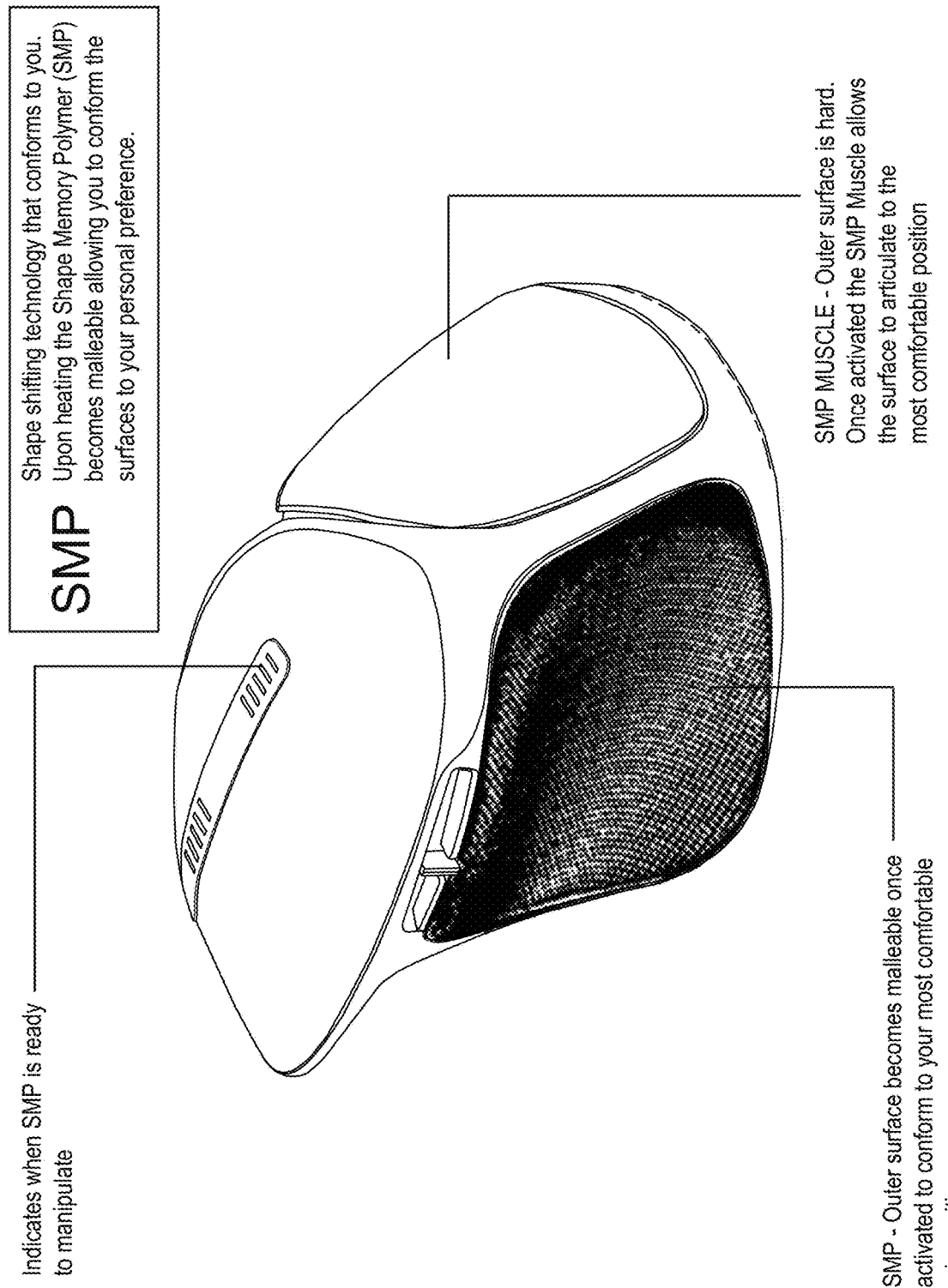
FIG. 11 depicts the incorporation of a shape memory polymer (SMP) in an input device, according to certain embodiments of the invention.

FIG. 10 illustrates input devices with shape shifting exo-skeletal panels and an internal SMP chassis, according to certain embodiments of the invention. Keyplates (button regions) are shown with rigid SMP muscle to help with click speed, consistency, and accuracy of response, as well as individual key plate angle orientation control. Trigger knuckles (e.g., knuckle support regions) and outer palm regions (palm support regions) employ malleable SMP panels to poise trigger fingers and improve grip. The thumb zone (e.g., first side support) utilizes a rigid SMP muscle to provide an assured grip, heat management (improved heat dissipation properties, airflow (breathability), reduced wear, light weight, and stiffness. As discussed above with respect to FIG. 5, certain embodiments are based on ergonomic heat-signature studies that highlight locations on the chassis that receive the most user hand contact. Some embodiments, like the input device shown in FIG. 11, include a visual display (e.g., LED lights) to indicate when the SMP is ready to be manipulated.

Figure 12:
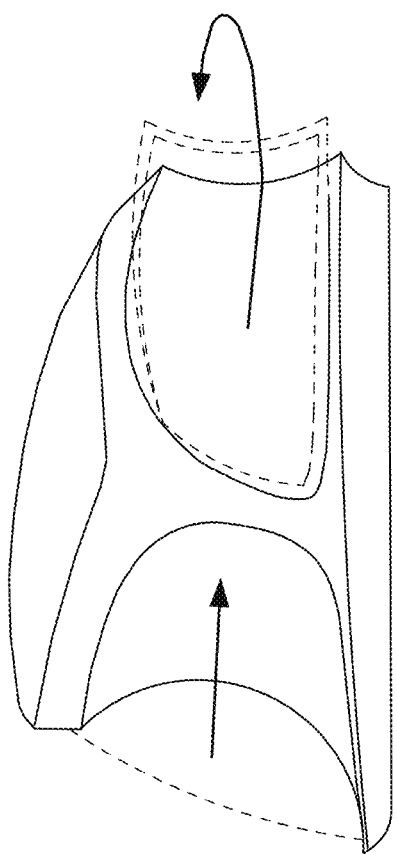
FIG. 12 depicts the incorporation of a shape memory polymer (SMP) in an input device, according to certain embodiments of the invention.
Figure 13:
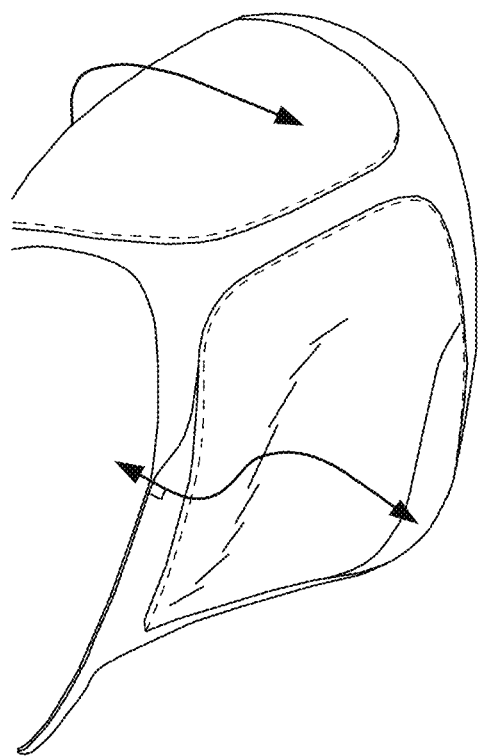
FIG. 13 depicts the manipulation of a shape memory polymer (SMP) on an input device, according to certain embodiments of the invention.
Figure 13:
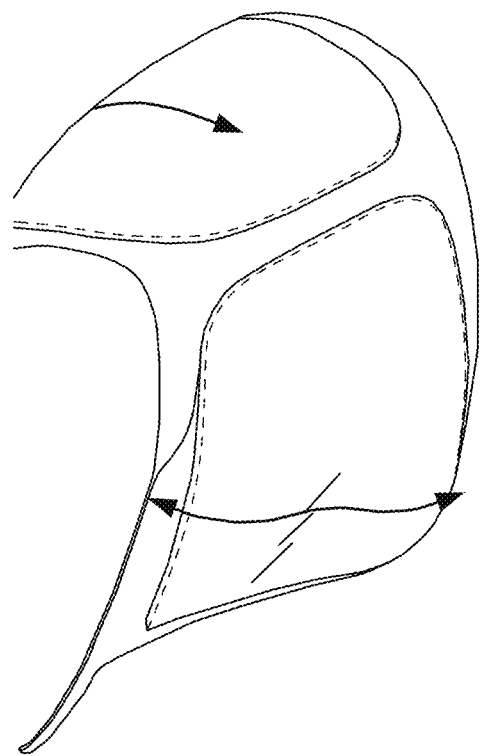
Figure 14C:
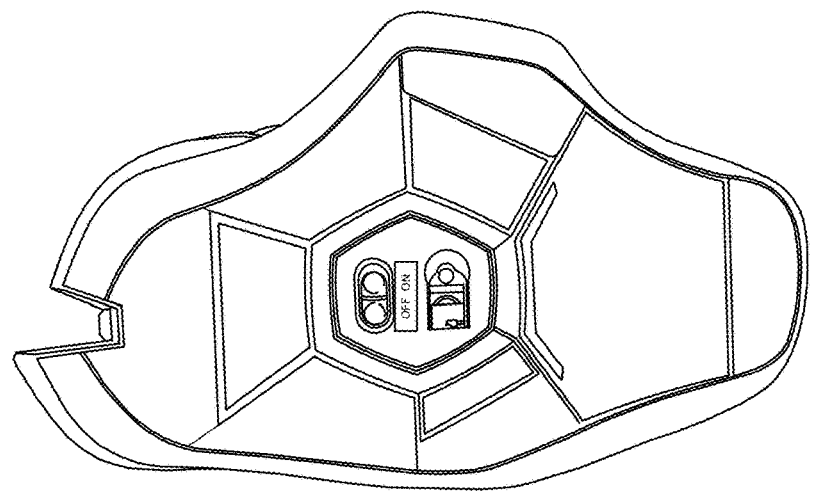
FIG. 14C is a bottom view of an input device, according to certain embodiments of the invention.
Figure 14B:
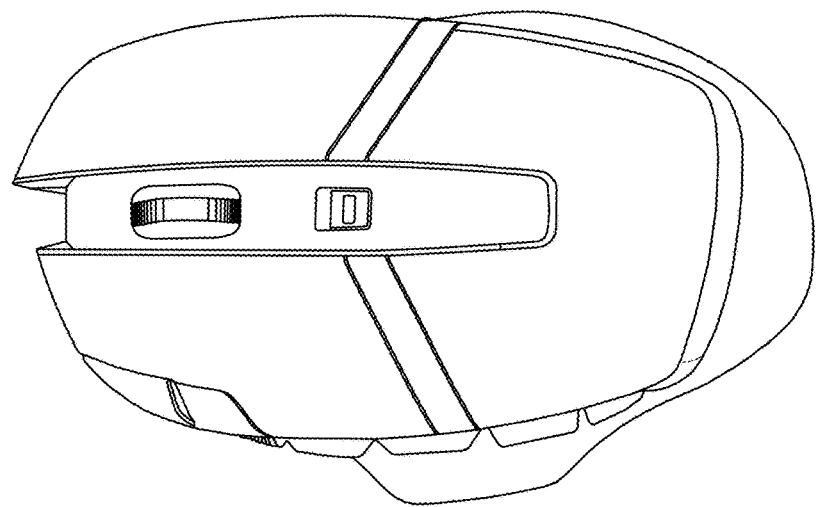
FIG. 14B is a top view of an input device, according to certain embodiments of the invention.
Figure 14A:
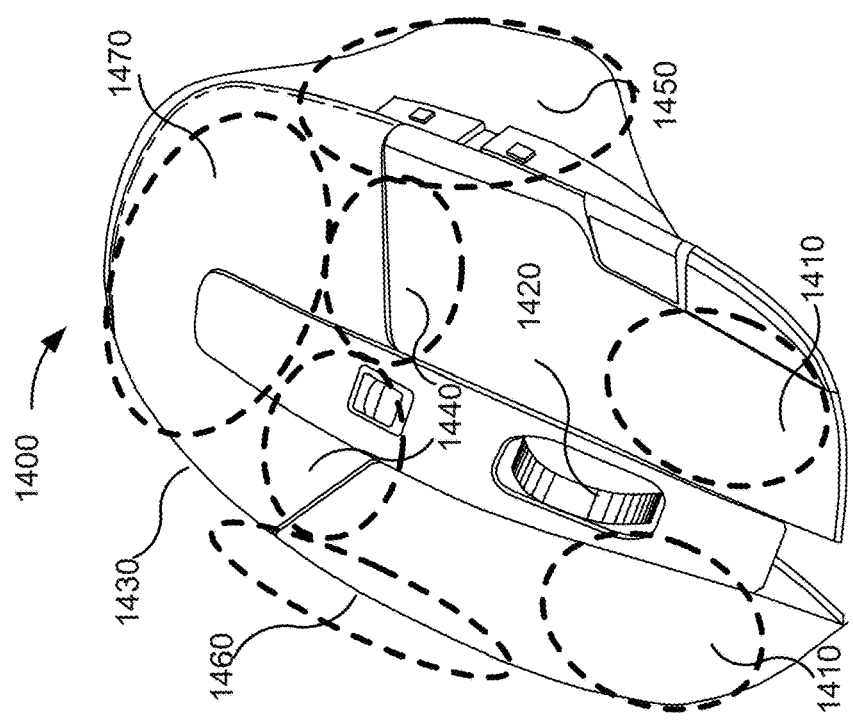
FIG. 14A is a perspective view of an input device, according to certain embodiments of the invention.

FIGS. 12 and 13 illustrate input devices with SMP features, according to certain embodiments of the invention. In FIG. 12, a thumb surface is shown that morphs between convex and concave forms to accommodate variation in grip styles and use cases. As shown, the rear panel can articulate into a comfortable position for ideal palm support for extended comfort.

FIGS. 14A-J depict a number of views of an input device, according to certain embodiments of the invention. Input device 1400 can include one or more buttons (e.g., left/right triggers) 1410, a scroll wheel 1420, a chassis 1430, a knuckle support region 1440, a first side region 1450 featuring a ridge (e.g., thumb scoop), a second side region 1460 featuring a ridge, a palm support region 1470 (e.g., palm rest), and more, as shown. It should be noted that any of the various regions described herein (e.g., knuckle support region, palm support region, SMP implementation, etc.) can be included in an embodiment. For example, some embodiments may use one of the regions described herein, and other may use more than one, all of the regions, or even include additional regions not necessarily explicitly described in this document. In this particular embodiment, each of the regions of input device 1400 are separated by a gap such that each region is separate and independent from one another. Some embodiments may have a gap around only some of the regions. Gap dimensions (e.g., width, length, depth) can vary by design. For example, gaps may be present at the surface of the input device, or may extend downward at any suitable distance. Furthermore, gaps dimensions may vary even around the same region to accommodate, e.g., the different levels of force and flexion experienced by each region in input device 1400.

Referring to FIGS. 14A-J, the side regions can include coatings that exhibit non-stick properties. Some embodiments utilize coverings, such as thermoplastic elastomer rubber (TPR) to increase the durability, as well as the actual and perceived comfort of the product. Some coatings, such as polytetrafluorethylene (PTFE), is anti-stick, has low-friction properties, a matte feel, and is perceived as anti-sweat. PTFE (or substitute) can provide a perceptible benefit to some people when used as a surface coating for certain areas of hand-held products, like a mouse (e.g., coatings on side regions, palm regions, knuckle regions, etc.). Other coatings and/or coverings can be utilized that exhibit similar properties.

According to certain embodiments, each of the regions (e.g., knuckle support region, palm support region, key plates, etc.) are separate due to the chassis design so that different textures and materials can be applied to each region. As described above, the panels are split or separated based on the thermal imaging studies, however other methods can be used to determine how users contact the input device. The split chassis provides more structural rigidity to the frame. In some cases, the panels (regions) are configured on the chassis. In FIGS. 14A-14J, the panels are flush against the chassis, so the spaces between regions are not externally visible. The negative spaces in areas that are not contacted can provide an improved visual effect, increased strength and rigidity, and passive cooling.

Some regions employ directional grips. For example, the side regions can include a coating or covering with a direction friction such that upward movements (e.g., lifting) has a relatively high coefficient of friction to prevent slippage during the lift, and a low coefficient of friction with downwards movements (e.g., repositions) or lateral movements (e.g., toward the front and back of the input device) to allow easy re-orientation, hand positioning, and the like. In some embodiments, the first side region is the left side region that includes a thumb support. The second side region can be the right side region and may include a pinkie and index finger support region. Each of the side regions may employ different materials and finishes to achieve optimum performance characteristics, as would be appreciated by one of ordinary skill in the art with the benefit of this disclosure. In some cases, Teflon coatings may be used to reduce fingerprints on key plates (buttons).

The knuckle support region provides comfort and can include coatings or coverings that provide directional friction. In gaming, a user may move their hand forward and backwards to reposition their hands, but rarely move their hands from side-to-side, which can lead to instability. The directional friction thus provides a low coefficient of friction for forward and backwards movements on the knuckle support region. Forward and backward movements correspond to movements toward the front of the input device (i.e., button region) and the back of the input device (e.g., palm support region). The regions employing coatings or coverings that provide directional friction provide more friction that would be present with no coating or covering on the particular region. The key plates, or button region, can be separate key plates to provide a more robust click experience for the user.

According to some embodiments, lighting mechanisms (e.g., LEDs, backlighting, etc.) can be incorporated into the input device to illuminate certain areas to indicate to a user that different coatings (and thus different direction frictions) are being used. Alternatively, patterns in the coatings or coverings can indicate a directionality of increased friction. Other materials can be used to provide different textures.

In some implementations, some regions may be replaceable or interchangeable. For example, buttons 1410 may be swapped out with different styled buttons (e.g., shape, dimensions, color, texture, etc.). Similarly, different knuckle regions having different contours can be used to accommodate different grip styles. Thus, each region is not only separate, but may be modular as well to provide vast customizable possibilities for the user. Some modular portions can change function as well. For instance, a first side support panel may utilize 6 buttons on the side of input device 1400, while another first side support panel may utilize 2 buttons. In some cases, each key plate (buttons) may be set at a different height or lateral arrangement. For example, FIG. 14 shows that the right button is longer than the left button and at a different elevation. Any ergonomic, aesthetic, or function aspect can be altered in a modular fashion, as would be appreciated by one of ordinary skill in the art.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A computer mouse comprising:
   a chassis;
   a knuckle support region coupled to the chassis, the knuckle support region including at least one of a coating or covering on a surface of the knuckle support region, the at least one of the coating or covering configured to provide a directionally dependent friction to an object moving along the surface of the knuckle support region,
   wherein the friction for the object moving along the surface of the knuckle support region is higher for side-to-side movements along the surface of the knuckle support region than for front-to-back movements along the surface of the knuckle support region.

2. The computer mouse of claim 1 further comprising:
   a first side region coupled to the chassis,
   wherein the first side region includes a first ledge to support a thumb of a hand.

3. The computer mouse of claim 2 further comprising:
a second side region to support one or more of a pinky or ring finger of the hand, the second side region coupled to the chassis,
wherein the second side region includes a second ledge to support the one or more of the pinky or ring finger.

4. The computer mouse of claim 3 wherein the first side region includes a coating or covering on a surface of the first side region that provides a directionally dependent friction such that the friction on the surface of the first side region is higher for upward movements by the thumb along the surface of the first side region than for downward movements by the thumb along the surface of the first side region,
wherein the second side region includes a coating or covering on a surface of the second side region that provides a directionally dependent friction such that the friction on the surface of the second side region is higher for upward movements by the pinky or ring finger along the surface of the second side region than for downward movements by the pinky or ring finger along the surface of the second side region.

5. The computer mouse of claim 1 wherein a palm region of the computer mouse includes a stick-resistant coating or covering.

6. The computer mouse of claim 1 further comprising:
a button region having one or more buttons to support one or more of a tip of an index finger or middle finger of a hand, the one or more buttons disposed on or integrated with the chassis,
wherein at least one button of the one or more buttons includes a coating to improve non-stick and fingerprint resistant properties of the at least one button.

7. An input device comprising:
a chassis including a first side region configured to support a user's thumb, wherein the first side region includes a coating or covering on a surface of the side region that provides a directionally dependent friction such that the friction on the surface of the side region is higher for upward movements by the thumb along the surface of the side region than for downward movements by the thumb along the surface of the first side region.

8. The input device of claim 7 wherein the chassis further includes:
a second side region configured to support one or more of a pinky or ring finger, wherein the second side region includes a coating or covering on a surface of the second side region that provides a directionally dependent friction such that the friction on the surface of the second side region is higher for upward movements by the pinky or ring finger along the surface of the second side region than for downward movements by the pinky or ring finger along the surface of the second side region.

9. The input device of claim 7 wherein the first side region includes a first ledge to support the thumb.

10. The input device of claim 8 wherein the second side region includes a second ledge to support the one or more of the pinky or ring finger.

11. The input device of claim 7 further comprising:
a knuckle support region coupled to the chassis, the knuckle support region including a coating or covering on a surface of the knuckle support region configured to provide a directionally dependent friction, wherein the friction on the surface of the knuckle support region is higher for side-to-side movements by a hand along the surface of the knuckle support than for front-to-back movements by the hand along the surface of the knuckle support region.

12. The input device of claim 8 further comprising a palm region, wherein the palm region includes a stick-resistant coating or covering.

\* \* \* \* \*